United States Patent Office 2,807,605
Patented Sept. 24, 1957

2,807,605
STABILIZED CHLOROETHYLENE POLYMERS

Carl B. Havens, Hope, Mich., assignor to The Dow Chemical Company, Midland, Mich., a corporation of Delaware No Drawing. Application November 3, 1955,
Serial No. 544,816

1 Claim. (Cl. 260—45.95)

This invention relates to new organic compounds and to polymeric compositions containing the same. More particularly, it relates to new organic compounds finding utility as light stabilizers for haloethylene polymers.

Haloethylene polymers are known to be highly sensitive to the effects of elevated temperatures and of light and under prolonged exposure to heat and light may become so degraded as to be commercially useless. It has been common practice to blend certain compounds with the polymer to stabilize it against the degradative effects of heat and light. Several of such compounds, however, are colored materials which impart an objectionable initial color to the stabilized composition and thus prevent the production of a commercially saleable white composition.

Still other disadvantages of many of the previous compounds are a high odor level and volatility. Obviously, any odor in the stabilizer will be transferred to the stabilized composition. When volatile stabilizers are employed the stabilizers volatilize out of the composition, leaving the composition in time unprotected against the degradative effects of light, particularly ultra-violet light. In addition, all of the compounds vary in their ability to absorb ultra-violet light and it is impossible to predict the effectiveness of any particular compound with any degree of certainty, and even then some of the compounds lose some of their effectiveness for absorbing ultraviolet light over a prolonged period of time.

In view of the above problems it would be desirable and it is the principal object of this invention to provide a new group of organic compounds useful for the stated purpose.

It is a further object to provide a polymeric haloethylene composition stabilized against the degradative effects of light by means of such compounds.

It is a still further object to provide a group of such compounds which have little or no color and have a low odor level.

Another object is to provide a group of such compounds which have low volatility.

Other objects will become apparent as the description of the invention proceeds.

The above and related objects are accomplished by means of a group of compounds having the general formula:

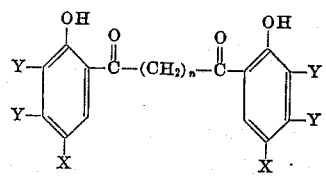

wherein $n$ is a whole number of from 4 to 10, preferably 4 to 8, X is selected from the group consisting of Cl, Br and alkyl groups of from 1 to 4 carbon atoms, and at least one Y on each ring is hydrogen and the remaining Y is selected from the group consisting of hydrogen, Cl, and alkyl groups of from 1 to 4 carbon atoms. As typical examples of compounds that are intended to be included in the scope of the invention may be mentioned the following:

1,6-bis(5-chloro-2-hydroxyphenyl)hexanedione
1,10-bis(5-chloro-2-hydroxyphenyl)decanedione
1,6-bis(5-methyl-2-hydroxyphenyl)hexanedione
1,9-bis(5-ethyl-2-hydroxyphenyl)nonanedione
1,7-bis(3,5-dichloro-2-hydroxyphenyl)heptanedione
1,8-bis(4,5-dichloro-2-hydroxyphenyl)octanedione
1,6-bis(5-bromo-2-hydroxyphenyl)hexanedione
1,8-bis(4,5-dibromo-2-hydroxyphenyl)octanedione
1,6-bis(5-tertiary butyl-2-hydroxyphenyl)hexanedione The method of preparation of the compounds will be illustrated by the following preparation of 1,6-bis(5-chloro-2-hydroxyphenyl)hexanedione. Two moles of p-chlorophenol and one mole of adipyl chloride were placed in a vessel together with chlorobenzene as a solvent. The reactants were heated to 60° C. until the reaction was substantially complete. Two moles AlCl₃ were added portionwise and the reaction mixture refluxed at 130° C. for 3 hours. After cooling, the reaction mixture was poured into an excess of ice and HCl. The organic layer was separated and washed several times with water following which the chlorobenzene was removed by distillation. The crude product was recrystallized from acetone.

In a similar manner, other typical derivatives were prepared from the corresponding dibasic acid chlorides. The tetrachloro derivatives were prepared from the corresponding dichlorophenols. The products were all white solids, free of any objectionable odor, and had melting points as shown in Table I.

TABLE I

| Compound | M. P. (° C.) |
|---|---|
| 1,6-bis(5-chloro-2-hydroxyphenyl)hexanedione | 196–198 |
| 1,9-bis(5-chloro-2-hydroxyphenyl)nonanedione | 115.4–116.5 |
| 1,10-bis(5-chloro-2-hydroxyphenyl)decanedione | 170.2–172.6 |

The compounds were evaluated as light stabilizers for haloethylene polymers. Because of their low odor level and their white color they produced compositions that were more merchandisable than compositions prepared from previous stabilizers. The effectiveness of the stabilizers of this invention will be more apparent from the following illustrative example in which all parts are by weight.

Example

A series of samples was prepared from a basic formulation consisting of 92 parts of a copolymer prepared from 85 percent vinylidene chloride and 15 percent vinyl chloride, 7 parts of acetyl triethyl citrate as a plasticizer, and 1 part of tetrasodium pyrophosphate as a heat stabilizer. To the basic formulation were added varying amounts of the compounds of this invention. Moldings 0.01 inch thick were made from the so stabilized composition. The moldings were exposed to direct sunlight in the State of Florida for one month after which the color of the exposed moldings were checked against the original color of the moldings. The results are tabulated in Table II.

TABLE II

| Compound added | Percent added | Original color | Color after 1 month exposure |
|---|---|---|---|
| None | | | Brown. |
| 1,6-bis (5-chloro-2-hydroxyphenyl) hexanedione. | 1 | Colorless | Light tan. |
| Do | 3 | ----do---- | Do. |
| 1,9-bis (5-chloro-2-hydroxyphenyl) nonanedione. | 1 | ----do---- | Slight. |
| Do | 3 | ----do---- | Do. |
| 1,10-bis (5-chloro-2-hydroxyphenyl) decanedione. | 1 | ----do---- | Do. |
| Do | 3 | ----do---- | Do. |

These and other tests have shown the new compounds to be useful light stabilizers for the various haloethylene polymers, including vinylidene chloride polymer and copolymers and vinyl chloride polymer and copolymers. The most useful range of concentration of the new compounds in such compositions is from 1 to 4 percent by weight.

I claim:

A thermoplastic composition comprising a chloroethylene polymer and from 1 to 4 percent of a compound having the general formula:

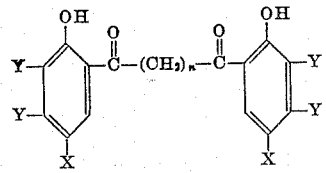

wherein $n$ is a whole number of from 4 to 10; X is selected from the group consisting of Cl, Br, and alkyl having from 1 to 4 carbon atoms, and at least one Y on each ring is hydrogen and the remaining Y is selected from the group consisting of hydrogen, chlorine, and alkyl having from 1 to 4 carbon atoms.

References Cited in the file of this patent

"Vitamins," Japan, volume 4, 1951, pages 422–424, copy in 45.95; abstracted in "Chemical Abstracts," volume 47, July-September (1953), Column 8315(g).